(12) United States Patent
Mazzocco et al.

(10) Patent No.: US 10,821,802 B2
(45) Date of Patent: Nov. 3, 2020

(54) SYSTEMS AND METHODS FOR AUXILIARY SEAT CLIMATE CONTROL

(71) Applicant: GM GLOBAL TECHNOLOGY OPERATIONS LLC, Detroit, MI (US)

(72) Inventors: Nicholas Mazzocco, Clawson, MI (US); Katrina Mazzocco, Clawson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 806 days.

(21) Appl. No.: 15/434,806

(22) Filed: Feb. 16, 2017

(65) Prior Publication Data
US 2018/0229582 A1  Aug. 16, 2018

(51) Int. Cl.
*B60H 1/34* (2006.01)
*B60H 1/00* (2006.01)

(52) U.S. Cl.
CPC ..... *B60H 1/00285* (2013.01); *B60H 1/00564* (2013.01); *B60H 1/00592* (2013.01); *B60H 1/00742* (2013.01); *B60H 1/00807* (2013.01); *B60H 1/00885* (2013.01)

(58) Field of Classification Search
CPC ............ B60H 1/00285; B60H 1/00564; B60H 1/00592; B60H 1/00742; B60H 1/00807; B60H 1/00885; B60H 1/00271; B60N 2/56; B60N 2/5642; B60N 2/26; B60N 2/30; B60N 2/5657
USPC .......................................................... 454/69
See application file for complete search history.

(56) References Cited

U.S. PATENT DOCUMENTS

| | | | | |
|---|---|---|---|---|
| 5,450,894 A | * | 9/1995 | Inoue .................. | B60H 1/00664 165/43 |
| 6,105,667 A | * | 8/2000 | Yoshinori .......... | B60H 1/00285 165/202 |
| 10,252,645 B1 | * | 4/2019 | Peterson .................. | B60N 2/28 |

* cited by examiner

*Primary Examiner* — Grant Moubry
*Assistant Examiner* — Ryan L Faulkner
(74) *Attorney, Agent, or Firm* — Lorenz & Kopf LLP

(57) ABSTRACT

Methods and systems for controlling a climate control system of a vehicle are provided. The provided system and method determines whether an auxiliary seat is in fluid communication with the climate control system. When an auxiliary seat is in fluid communication with the climate control system, commands are generated for the climate control system to assure that a combination of airflow temperature and airflow velocity to the auxiliary seat are within configurable targets.

18 Claims, 3 Drawing Sheets

SYSTEMS AND METHODS FOR AUXILIARY SEAT CLIMATE CONTROL

TECHNICAL FIELD

The technical field generally relates to climate control systems, and more particularly relates to a vehicle climate control system for use with an auxiliary seat.

BACKGROUND

Automatic climate control systems are becoming more prevalent in vehicles. Such systems attempt to regulate the temperature inside the vehicle to a temperature set by the user. Generally these climate control systems determine a temperature and an airflow and distribution required to regulate the temperature based upon a lookup table which has to be tuned based upon iterative vehicle tests. The tuning can be subjective and may not accurately control the temperature, particularly when an auxiliary seat, such as a child seat, is placed within the vehicle.

Accordingly, it is desirable to provide improved methods and systems for controlling the airflow through the climate control system when an auxiliary seat is present. It is further desirable to provide direct control over airflow to the auxiliary seat. Furthermore, other desirable features and characteristics of the present invention will become apparent from the subsequent detailed description and the appended claims, taken in conjunction with the accompanying drawings and the foregoing technical field and background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A heating, ventilating, and air conditioning (HVAC) system for controlling airflow of a vehicle is provided. The HVAC system comprises: a duct providing an airflow path from a first location at a point of generation of airflow to a second location in the vehicle; an auxiliary airflow path having an inlet and an outlet, the inlet being in fluid communication with the duct, the auxiliary airflow path having a first airflow valve positioned therein, the first airflow valve movable between a closed position, wherein the first airflow valve impedes airflow through the auxiliary airflow path, and an open position; and a control module coupled to the HVAC system, wherein the control module commands the HVAC system to adjust airflow responsive to the position of the first airflow valve.

Also provided is a method for controlling an HVAC system for a vehicle. The method comprises: sensing when an auxiliary seat is in fluid communication an auxiliary airflow path, the auxiliary airflow path being in fluid communication with a duct of the HVAC system, the duct providing an airflow path from a first location at a point of generation of airflow to a second location in the vehicle; sensing a position of a first airflow valve positioned within the auxiliary airflow path, the first airflow valve movable between a closed position, wherein the first airflow valve impedes airflow through the auxiliary airflow path, and an open position; and commanding, by a control module, the HVAC system to adjust airflow responsive to the position of the first airflow valve.

Another method for controlling airflow through an HVAC system for a vehicle is provided. The method comprises: sensing a current temperature in an auxiliary airflow path in fluid communication with a duct of the HVAC system; sensing a position of an airflow valve positioned within the auxiliary airflow path, the airflow valve movable between a closed position, wherein the first airflow valve impedes airflow through the auxiliary airflow path, and an open position; and commanding, by the control module, the HVAC system to adjust airflow responsive to a combination of the position of the first airflow valve, the current temperature in the auxiliary airflow path, and a target temperature.

Other desirable features will become apparent from the following detailed description and the appended claims, taken in conjunction with the accompanying drawings and this background.

DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

Figure 1:
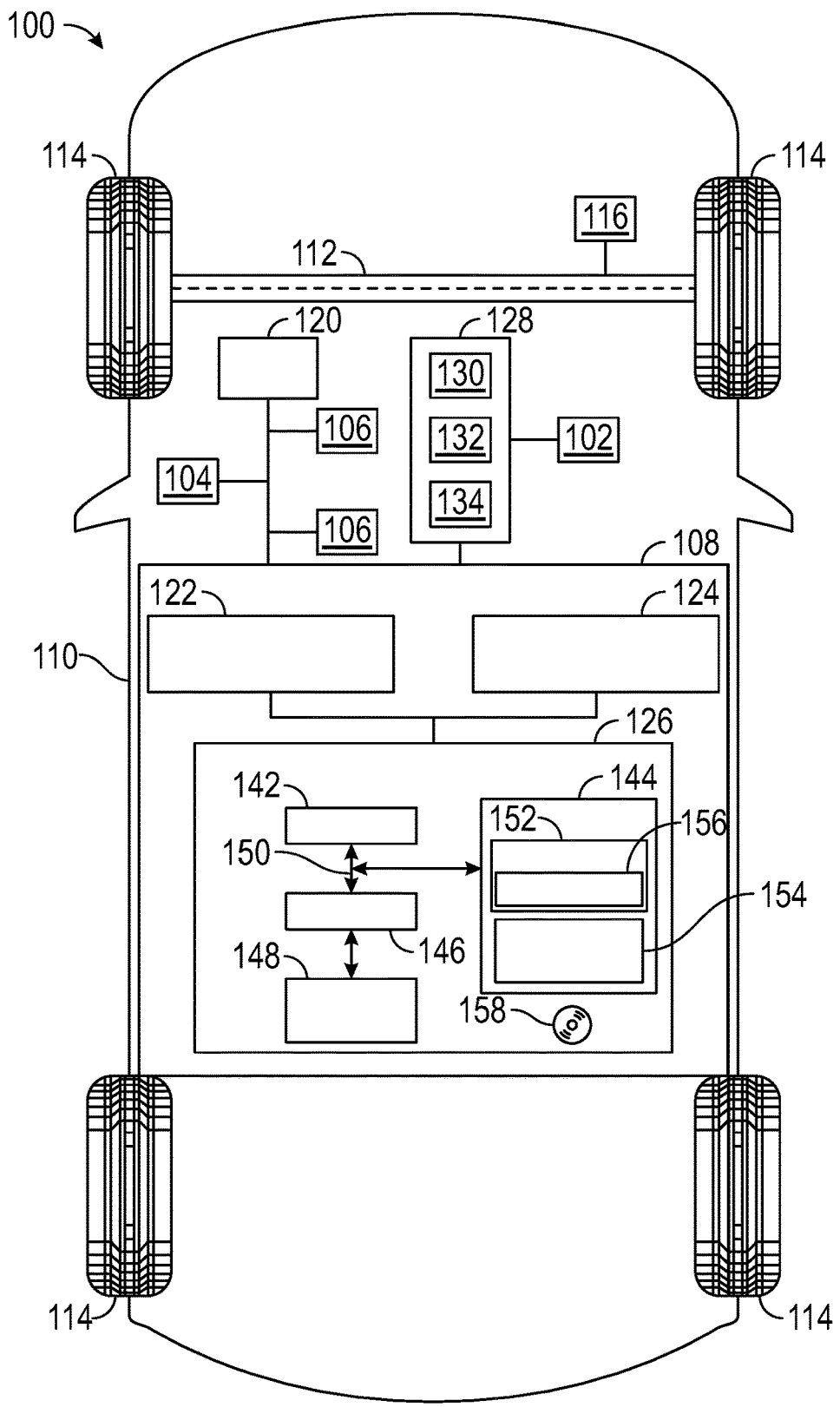
FIG. 1 is a functional block diagram of a vehicle, in accordance with an exemplary embodiment.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any combination of hardware, software, firmware, electronic control components, processing logic, and/or processor devices, including, without limitation: an application specific integrated circuit (ASIC), an electronic circuit, a processor (shared, dedicated, or group) and memory device that together executes one or more software or firmware programs, a combinational logic circuit, and/or any other suitable components that provide the described functionality.

For the sake of brevity, conventional techniques related to the transmittal of data, sensors, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Turning now to FIG. 1, a functional block diagram of a vehicle 100 is depicted, in accordance with an exemplary embodiment. The vehicle 100 may be an automobile, an aircraft, a spacecraft, a watercraft or any other type of mobile platform. The vehicle 100 includes a body 110 that is arranged on a chassis 112. The body 110 substantially encloses the systems and components of the vehicle 100. The body 110 and the chassis 112 may jointly form a frame. The vehicle 100 also includes a plurality of wheels 114. The wheels 114 are each rotationally coupled to the chassis 112 near a respective corner of the body 110 to facilitate movement of the vehicle 100. In the depicted embodiment, the vehicle 100 includes four wheels 114, although this may vary in other embodiments (for example for trucks and certain other vehicles). Non-limiting examples of the systems and components that may be enclosed within the body 110 of the vehicle 100 include: a drive system 116, a user input device 104, an audio system 118, a display device 106, a navigation system 120, a HVAC system 128, and a control system 108. These functional blocks are described in more detail below.

The drive system 116 is mounted on the chassis 112, and drives the wheels 114. The drive system 116 preferably comprises a propulsion system. In certain exemplary embodiments, the drive system 116 comprises an internal combustion engine and/or an electric motor/generator, coupled with a transmission thereof. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

The user input device 104 may be any one, or combination, of various known user input device devices including, but not limited to, a touch sensitive screen, a cursor control device (CCD) (not shown), such as a mouse, a trackball, or joystick, and/or a keyboard, one or more buttons, switches, or knobs. The audio system 118 may comprise one or more subsystems sufficient to detect and generate sounds and/or speech, and can be responsive to user input and/or the control system 108. The display device 106 may be implemented using any one of numerous known display devices suitable for rendering textual, graphic, and/or iconic information in a format viewable by a user. Non-limiting examples of such display devices include cathode ray tube (CRT) displays, and flat panel displays such as LCD (liquid crystal displays) and TFT (thin film transistor) displays. The navigation system 120 includes sensors, devices, instruments (such as radar, Lidar, and a global positioning system (GPS)), and software, sufficient for detecting and providing vehicle position, location, and orientation.

In various embodiments, any combination of the user input device 104, display device 106, audio system 118, and navigation system 120 can be part of an existing console or user interface associated with the vehicle 100, and may be integrated to accept user input (for example, as manipulated buttons, speech, or touch screen interaction). Regardless of the state of integration of these systems, a user may control one or more features of the systems onboard the vehicle by providing user input via at least the user input device 104. Specific to the exemplary embodiment, user input may be received to configure target air temperatures and target airflow velocities for the HVAC system 128 and for the auxiliary airflow path 102 (described in more detail below).

In various embodiments, the HVAC system 128 generally includes one or more of a heating system 130, an air conditioning system 132, and a ventilation system 134, each of which may be located within the HVAC system 128 at a centralized point of generation of airflow. The heating system 130 and the air conditioning system 132 may include, but are not limited to, at least one air delivery motor, at least one blower motor, at least one heat exchanger, a compressor, at least one thermal expansion valve, and at least one coolant pump. As will be described in connection with FIG. 2, the HVAC system 128 also embodies airflow paths and ducts sufficient for providing climate control specific to existing seats, such as front seats 204 and back seats 206, within the interior of the vehicle 100.

Figure 2:
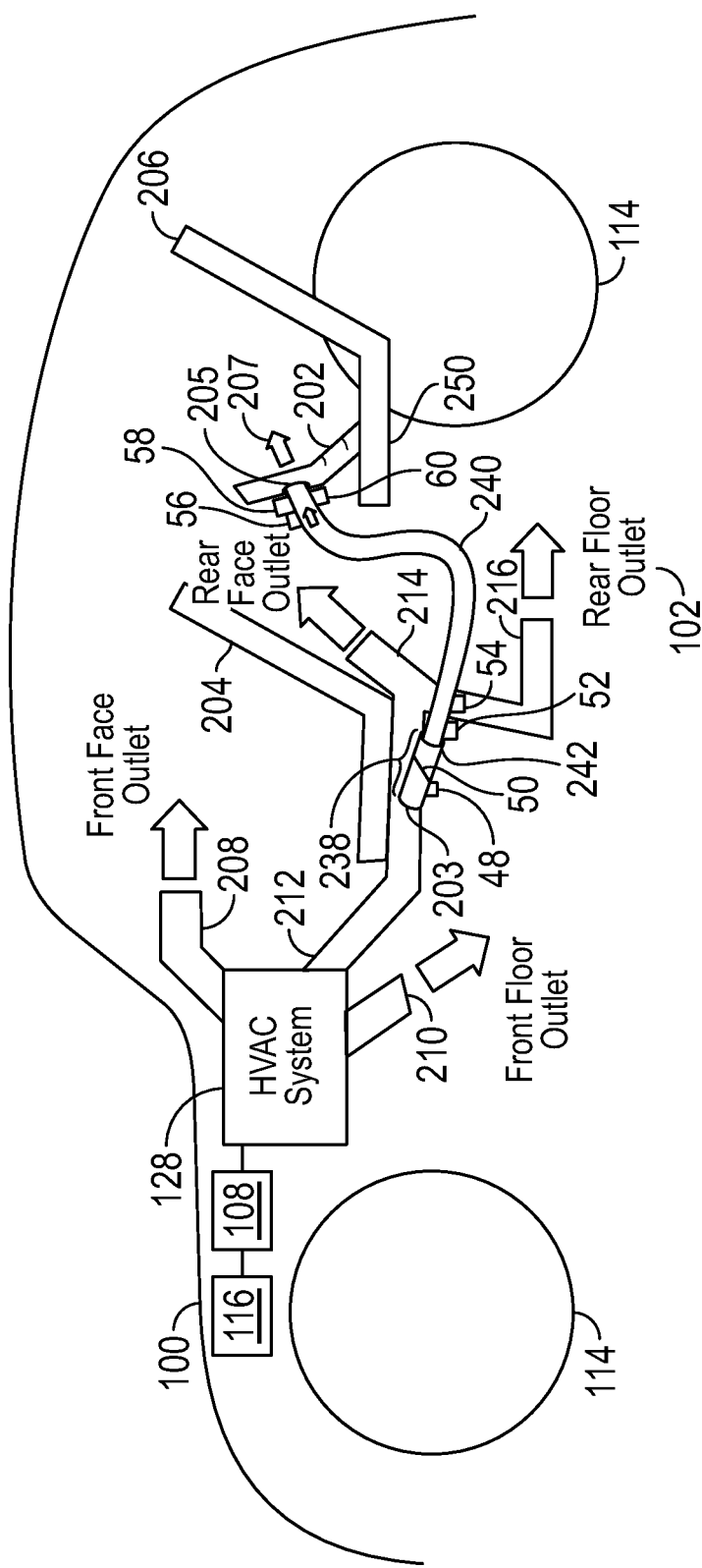
FIG. 2 is a simplified perspective view of the vehicle of FIG. 1, in accordance with the exemplary embodiment.

In addition to the airflow paths of the existing HVAC system 128, the vehicle 100 includes an additional airflow path that has the components and features sufficient to provide controlled airflow from the existing HVAC system 128 to an auxiliary seat (FIG. 2, auxiliary seat 202). As used herein, this additional airflow path is referred to as an "auxiliary airflow path" 102. In various embodiments, the "auxiliary seat" 202 may comprise a child seat, a pet crate, a food storage container, or any storage or seating element that is auxiliary to the vehicle 100, and for which individualized climate control is desirable. Features of the auxiliary airflow path 102 are controlled by the control system 108, as depicted and described in connection with FIGS. 2-3.

The control system 108 is in operable communication with, and may provide centralized control for the navigation system 120, the HVAC system 128, the display device 106, the user input device 104, the audio system 118, and the auxiliary airflow path 102. As depicted in FIG. 1, the control system 108 includes a sensor system 122, a transceiver 124, and a control module 126, each described below.

The sensor system 122 of the vehicle 100 generally includes sensors, devices, and software, sufficient for detecting and providing vehicle status data. In various embodiments, the sensor system includes sensors that detect electrical, pressure, and/or mechanical connection of components, sensors that detect temperature, and sensors that detect airflow (velocity). In addition to the sensors comprising the sensor system 122, the auxiliary airflow path 102 may comprise one or more sensors, devices, and software, sufficient for detecting and providing status data associated with the auxiliary airflow path 102, for example, a sensor 48 to detect the position of a valve 50, and a sensor to detect one or more from the set including the presence of an auxiliary seat (sensor 60), airflow velocity within the auxiliary airflow path (sensor 54 and 58), and airflow temperature within the auxiliary airflow path (sensor 52 and 56).

The transceiver 124 may include at least one receiver and at least one transmitter that are operatively coupled to the processor 142. The transceiver 124 can enable the control module 126 to establish and maintain the communications links to onboard components and external communication sources, including wireless communication. The transceiver 124 can perform signal processing (e.g., digitizing, data encoding, modulation, etc.) as is known in the art. In some embodiments, the transceiver 124 is integrated with the control module 126.

Among other control features, the control system 108 receives inputs from (i) the user input device 104, and (ii) the auxiliary airflow path 102, processes the inputs, and takes actions to command the HVAC system 128 as appropriate based thereon. In various embodiments, the control system 108 performs these actions and other functions in accordance with steps of the method 300 described further below in connection with FIGS. 2 and 3.

With continued reference to FIG. 1, the components of the control module 126 and their functions are described. In the depicted embodiment, the computer system of the control module 126 includes a processor 142, a memory 144, an interface 146, a storage device 148, a bus 150, and an optional storage disk 158. The processor 142 performs the computation and control functions of the control module 126, and may comprise any type of processor or multiple processors, single integrated circuits such as a microprocessor, or any suitable number of integrated circuit devices and/or circuit boards working in cooperation to accomplish the functions of a processing unit. During operation, the processor 142 loads and executes one or more programs or algorithms embodied as instructions and applications 152 contained within the memory 144 and, as such, controls the general operation of the control module 126 and the computer system of the control module 126. In executing the processes described herein, such as the method 300 of FIG. 3, the processor 142 loads and executes at least program 156.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced instructions and applications 152 along with one or more stored values 154.

The storage device 148 can be any suitable type of storage apparatus, including direct access storage devices such as hard disk drives, flash systems, floppy disk drives and optical disk drives. In one exemplary embodiment, the storage device 148 comprises a program product from which memory 144 can receive a program 156 that executes one or more embodiments of one or more processes of the present disclosure, such as the steps of the method 300 (and any sub-processes thereof) described further below in connection with FIG. 3. In another exemplary embodiment, the program product may be directly stored in and/or otherwise accessed by the memory 144 and/or a disk (e.g., disk 158), such as that referenced below.

The bus 150 serves to transmit programs, data, status and other information or signals between the various components of the computer system of the control module 126. The bus 150 can be any suitable physical or logical means of connecting computer systems and components. This includes, but is not limited to, direct hard-wired connections, fiber optics, infrared and wireless bus technologies. During operation, the program 156, stored in the memory 144, is loaded and executed by the processor 142.

The interface 146 enables communication to the computer system of the control module 126, for example from a system driver and/or another computer system, and can be implemented using any suitable method and apparatus. In one embodiment, the interface 146 obtains the various data from the sensors of the sensor system 122 and/or the transceiver 124. The interface 146 can include one or more network interfaces to communicate with other systems or components. The interface 146 may also include one or more network interfaces to communicate with technicians, and/or one or more storage interfaces to connect to storage apparatuses, such as the storage device 148.

It will be appreciated that the control module 126 may differ from the embodiment depicted in FIG. 1, for example, the control module 126 may be coupled to or may otherwise utilize one or more remote computer systems and/or external (to vehicle 100) control systems. It will also be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program 156 and containing computer instructions stored therein for causing a computer processor (such as the processor 142) to perform and execute the program 156. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

Turning now to FIG. 2, and as mentioned, the HVAC system 128 comprises not only the subsystems that generate airflow, but a variety of airflow paths, piping, ducts, and exhaust vents that provide (i) structure and routing for the generated airflow to travel from a point of generation to various locations in the interior of the vehicle 100, as well as (ii) airflow outlets at designated locations within the vehicle 100. Non-limiting examples of the HVAC system 128 structure and routing that are shown in FIG. 2 include: duct 208, directed as a front face outlet; duct 210, directed as a front floor outlet; duct 212, serving as a connector duct; duct 214, serving as a rear face outlet; and, duct 216, serving as a rear floor outlet. In the depicted embodiment, duct 212, in combination with duct 214 and duct 216 provide an existing airflow path that routes airflow from its point of generation to a rear portion of the vehicle 100. It is to be appreciated that the number, size, and location of the airflow paths and ducts may vary from one embodiment to another to meet the needs of the respective vehicle 100. The HVAC system 128, under command of the control module 126, generates the airflow that is routed via the airflow paths and ducts throughout the interior of the vehicle 100.

The auxiliary airflow path 102 is shown coupling the HVAC system 128 to an auxiliary seat 202. In the embodiment depicted in FIG. 2, the auxiliary airflow path 102 is shown attached to the connector duct 212, at a location that is approximately vertically medial to the duct 214 (rear face outlet) and the duct 216, (rear floor outlet). However, in other embodiments, the auxiliary airflow path 102 may attach to the HVAC system 128 at locations other than proximate the rear outlets, and may be described as providing an airflow path from a first location (at a point of attachment to the HVAC system 128) to a second location (at some distance and orientation away from the HVAC system 128). The auxiliary airflow path 102 comprises an inlet 203, which is configured to attach to the existing airflow duct 212 of the HVAC system 128, and an outlet 205, configured for attaching to the auxiliary seat 202. The auxiliary airflow path 102 may further comprise a first airflow valve 50, a duct 238, and one or more sensors (48, 52, 54, 56, 58, and 60); each of these components is described in more detail below.

The first airflow valve 50 is positioned in the auxiliary airflow path 102 near the inlet 203, and configured to control airflow through the auxiliary airflow path 102 responsive to commands from the control module 126. Accordingly, the first airflow valve 50 is movable between a closed position, in which the first airflow valve 50 impedes airflow through the auxiliary airflow path 102, and an open position in which airflow is not impeded. A sensor 48 may be employed to detect the position of the first airflow valve and provide the position information to the control module 126. The control module 126 controls generated airflow by the HVAC system 128 responsive to a combination of the position of the first airflow valve, received sensor data, and user input. The airflow through the auxiliary airflow path 102 has a target destination of the auxiliary seat 202 (shown as airflow 207). In some embodiments, the control module 126 may control the position of first airflow valve 50 and, consequently, airflow through the auxiliary airflow path 102, based on a combination of received sensor data and user input.

In some embodiments, the duct 238 that provides structure and is dedicated for use by the auxiliary airflow path 102 is integrated with the inlet 203 of the auxiliary airflow path 102. In other embodiments, the duct 238 is integrated with the HVAC system 128 at a point where the auxiliary airflow path 102 is attached to the HVAC system 128. The duct 238 is configured to ensure fluid communication between the HVAC system 128 and the auxiliary airflow path 102 when the auxiliary airflow path 102 is attached to the HVAC system 128. The sensor 52 may detect temperature at the inlet 203 end of the auxiliary airflow path 102 and the sensor 54 may detect velocity of airflow at the inlet 203 end of the auxiliary airflow path 102.

Outlet 205 of the auxiliary airflow path 102 may take a variety of forms suitable for attaching and delivering airflow 207 to a receptor 250 associated with the auxiliary seat 202. As mentioned previously, the "auxiliary seat" 202 may comprise a child seat, a pet crate, a food storage container, or any storage or seating element that is auxiliary to the vehicle 100, and for which individualized climate control is desirable. The sensor 60 is oriented and configured to detect secured, fluid communication between the outlet 205 and the auxiliary seat 202. As such, the sensor 60 may be a pressure sensor configured to detect a coupling with the receptor 250, a mechanical sensor, or an electrical sensor.

In various embodiments, the auxiliary seat 202 comprises a ducting structure (not shown) for distributing received airflow 207. Additional sensors may be employed at the outlet 205, for example, the sensor 56 may detect temperature at the outlet 205 end of the auxiliary airflow path 102 and the sensor 58 may detect velocity of airflow at the outlet 205 end of the auxiliary airflow path 102. In various embodiments, the auxiliary airflow path 102 may further comprise an adapter hose 240 having a first end 242 and a second end, the first end 242 configured to attach to the duct 238, the second end of the adapter hose being the outlet 205 of the auxiliary airflow path 102.

As mentioned, the control module 126 processes a plurality of input data and signals to generate commands for the HVAC system 128. Input data may comprise user input and data from the sensors (48, 52, 54, 56, 58, and 60). Responsive thereto, the HVAC system 128 generates airflow and controls one or more valves to route airflow through the airflow paths and ducts (208, 210, 212, 214, and 216). In some embodiments, the control module 126 determines when a duct of the HVAC system has attached thereto an auxiliary airflow path, such determination may be made based on a combination of sensor data. The control module 126 processes the input data then adjusts/controls airflow to the auxiliary airflow path 102 by commanding the HVAC system 128 to adjust airflow accordingly, as described in connection with FIG. 3.

Figure 3:
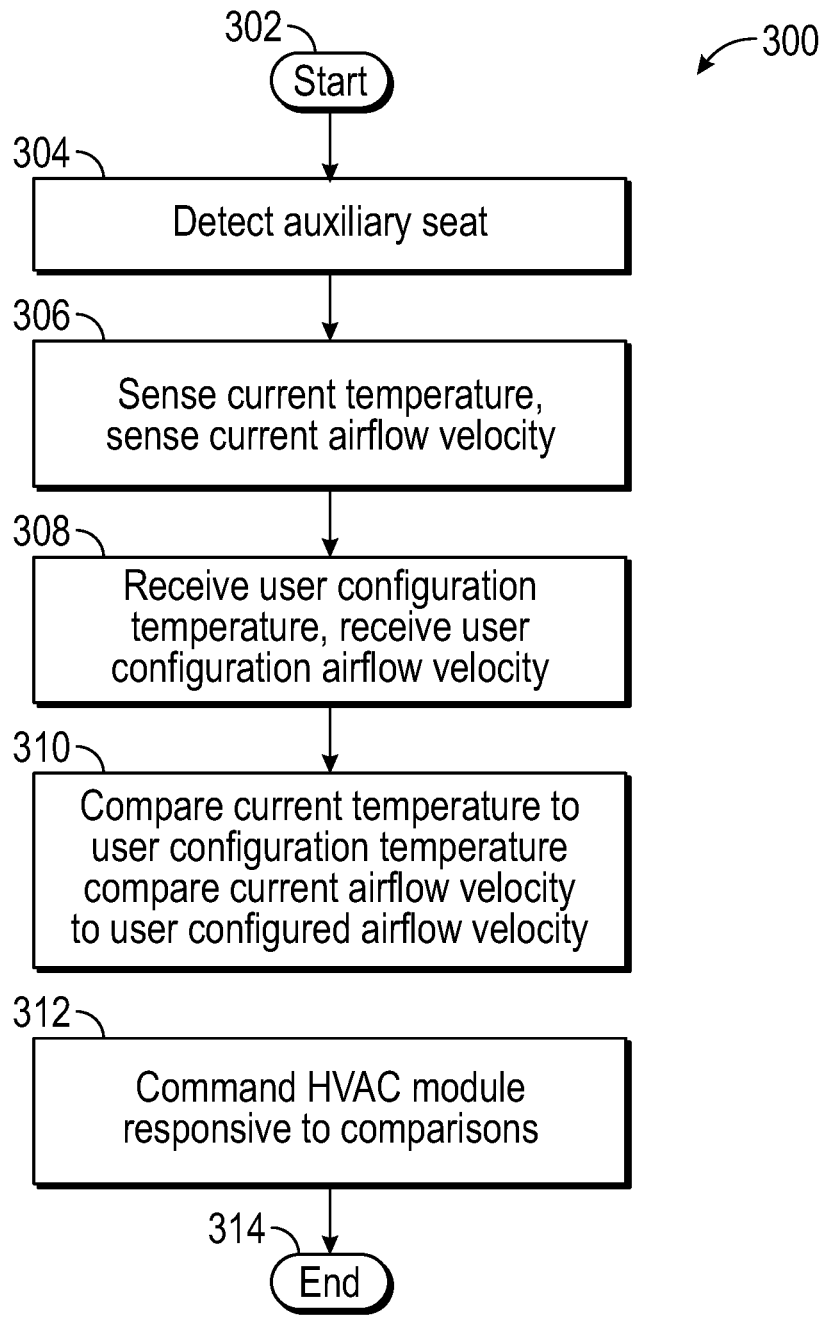
FIG. 3 is a flowchart of a method for controlling an HVAC system in accordance with various embodiments.

With reference now to FIG. 3, and with continued reference to FIGS. 1-2, a flowchart is shown of a method 300 for controlling an HVAC system 128 in accordance with various embodiments. The method 300 can be implemented in connection with the vehicle 100 of FIGS. 1 and 2 and can be performed by the control module 126 of FIG. 1, in accordance with various exemplary embodiments. As can be appreciated in light of the disclosure, the order of operation within the method is not limited to the sequential execution as illustrated in FIG. 3, but may be performed in one or more varying orders as applicable and in accordance with the present disclosure. As can further be appreciated, the method of FIG. 3 may be scheduled to run at predetermined time intervals during operation of the vehicle 100 and/or may be scheduled to run based on predetermined events.

The method 300 may begin at 302. An auxiliary seat 202 is sensed or detected at 304. As mentioned, the sensor 60 detects when the auxiliary seat 202 is in fluid communication with auxiliary airflow path 102. At 306, at least one of: current temperature (sensor 52, sensor 56) in the auxiliary airflow path 102; and, current airflow velocity (sensor 54, sensor 58) in the auxiliary airflow path 102 is sensed. In some embodiments, sensing at 306 is conditioned upon having first determined that the auxiliary seat 202 is in fluid communication with auxiliary airflow path 102 (304), and is not performed otherwise.

A user configured target air temperature is received at 308. The control module 126 may receive a user configured target auxiliary seat temperature and/or a user configured target airflow velocity. These user configured inputs may be received real-time, or may be received in advance and stored as stored values 154 in the memory 144. The user configured target temperature is compared to the sensed current temperature at 310, creating a first comparison. Likewise, when a user configured target airflow velocity is received at 308, the user configured target airflow velocity is compared to the sensed current airflow velocity in the auxiliary airflow path 102 at 310, creating a second comparison.

At 312 a signal is generated to command the HVAC system 128 to adjust airflow. When an absolute value of the first comparison is greater than a first margin, a signal is generated to command the HVAC system 128 to adjust temperature of airflow into auxiliary airflow path 102 at 312. When an absolute value of the second comparison is greater than a second margin, a signal is generated to command the HVAC system 128 to adjust velocity of airflow into auxiliary airflow path 102 at 312.

In various embodiments, the signal generated to command the HVAC system 128 to adjust airflow is based on a combination of the first comparison and second comparison. Thereafter, the method 300 may continue, for example, during the course of operating the vehicle, by returning to 304, or the method may end at 314.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A control system for controlling a heating, ventilating, and air conditioning (HVAC) system of a vehicle, the control system comprising:
   an auxiliary airflow path having an inlet configured to attach to an existing airflow duct of the HVAC of the vehicle and provide fluid communication therewith and an outlet configured to attach to an auxiliary seat, the auxiliary airflow path having therein an airflow valve positioned near the inlet, the airflow valve movable between a closed position, wherein the airflow valve impedes the airflow through the auxiliary airflow path, and an open position;
   the auxiliary airflow path having a position sensor to detect the position of the airflow valve;
   a presence sensor oriented and configured to detect secured fluid communication between the outlet and an auxiliary seat placed in the vehicle;
   a control module comprising a processor coupled to the HVAC system, the control module configured to receive and process input from the position sensor and command the HVAC system to adjust generation of airflow in the existing airflow duct responsive to the position of the airflow valve and upon further condition that the auxiliary seat is in fluid communication with the outlet of the auxiliary airflow path.

2. The control system of claim 1, further comprising an inlet temperature sensor operably coupled to the control module and configured to sense a current temperature in the auxiliary airflow path, and command the HVAC system to adjust airflow temperature in the existing airflow duct responsive thereto.

3. The control system of claim 2, wherein the control module is further configured to command the HVAC system to adjust airflow based on a comparison of a user configurable target airflow temperature to the current airflow temperature.

4. The control system of claim 3, wherein the auxiliary airflow path further comprises an inlet duct disposed at the inlet of the auxiliary airflow path, the inlet duct being configured for fluid communication between the HVAC system and the auxiliary airflow path.

5. The control system of claim 4, wherein the auxiliary airflow path further comprises an adapter hose having a first end and a second end, the first end configured to attach to the inlet duct, the second end of the adapter hose being configured to attach to a receptor associated with the auxiliary seat.

6. The control system of claim 5, wherein the auxiliary seat is a child seat.

7. The control system of claim 1, further comprising an inlet airflow velocity sensor operably coupled to the control module and configured to sense a current airflow velocity in the auxiliary airflow path, and command the HVAC system to adjust airflow velocity in the existing airflow duct responsive thereto.

8. The control system of claim 7, wherein the control module is further configured to command the HVAC system to adjust airflow based on a comparison of the user configurable target air airflow velocity and the current airflow velocity.

9. A method for controlling an HVAC system for a vehicle, the method comprising: at a control module comprising a processor, sensing, via a presence sensor, when an auxiliary seat is in fluid communication with an auxiliary airflow path, the auxiliary airflow path being in fluid communication with a connector duct of the HVAC system, the connector duct providing an airflow path from a first location at a point of generation of airflow in the HVAC to a second location in the vehicle; sensing, via a position sensor, a position of an inlet airflow valve positioned within the auxiliary airflow path, the inlet airflow valve movable between a closed position, wherein the inlet airflow valve impedes the airflow through the auxiliary airflow path, and an open position; and commanding, the HVAC system to adjust the airflow in the connector duct responsive to the position of the first airflow valve and upon condition that the auxiliary seat is in fluid communication with the outlet of the auxiliary airflow path.

10. The method of claim 9, further comprising sensing, via a temperature sensor, a current temperature in the auxiliary airflow path.

11. The method of claim 10, further comprising comparing, by the processor of the control module, the current temperature in the auxiliary airflow path to a target temperature provided by a user, and commanding, by the processor of the control module, the HVAC system to adjust air temperature responsive to the comparison.

12. The method of claim 11, further comprising receiving, by the processor of the control module, the target temperature from a user input device.

13. The method of claim 9, further comprising sensing, via an airflow velocity sensor, a current airflow velocity in the auxiliary airflow path.

14. The method of claim 13, further comprising comparing, by the processor of the control module, the current airflow velocity in the auxiliary airflow path to a target airflow velocity provided by a user, and commanding, by the processor of the control module, the HVAC system to adjust air velocity responsive to the comparison.

15. The method of claim 14, further comprising receiving, by the processor of the control module, the target airflow velocity, from a user input device.

16. A method for controlling an HVAC system for a vehicle, the method comprising: sensing, by a temperature sensor, a current temperature in an auxiliary airflow path in fluid communication with a duct of the HVAC system, the auxiliary airflow path having an outlet in fluid communication with an auxiliary seat; sensing, via a presence sensor, when the auxiliary seat is in fluid communication with the auxiliary airflow path; sensing, by a position sensor, a position of an airflow valve positioned within the auxiliary airflow path, the airflow valve movable between a closed position, wherein the airflow valve impedes airflow through the auxiliary airflow path, and an open position; and commanding, by a processor of a control module, the HVAC system to adjust the airflow temperature and airflow velocity responsive to a combination of the sensed position of the airflow valve, the sensed current temperature in the auxiliary airflow path, and a target temperature.

17. The method of claim 16, wherein commanding the HVAC system to adjust airflow temperature and airflow velocity is further conditioned upon sensing that an auxiliary seat is in fluid communication the auxiliary airflow path.

18. The method of claim 17, further comprising sensing, by an inlet airflow velocity sensor, a current airflow velocity in the auxiliary airflow path, and wherein commanding the HVAC system to adjust airflow velocity is additionally based on the sensed current airflow velocity and a target airflow velocity.

* * * * *